United States Patent [19]
Brennan

[11] Patent Number: 6,014,648
[45] Date of Patent: Jan. 11, 2000

[54] ELECTRONIC CARD VALET

[75] Inventor: Sherry Brennan, 132A Carlotta Cir., Mill Valley, Calif. 94941

[73] Assignee: Sherry Brennan, Calif.

[21] Appl. No.: 08/931,792

[22] Filed: Sep. 16, 1997

Related U.S. Application Data

[60] Provisional application No. 60/026,247, Sep. 17, 1996.

[51] Int. Cl.⁷ ............................................. G07F 7/10
[52] U.S. Cl. ...................................................... 705/41
[58] Field of Search .................................. 235/380, 441; 364/700; 150/139; 705/41, 40; 395/200

[56] References Cited

U.S. PATENT DOCUMENTS

| | | | |
|---|---|---|---|
| 4,277,837 | 7/1981 | Stuckert | 364/900 |
| 4,719,338 | 1/1988 | Avery et al. | 235/380 |
| 4,849,615 | 7/1989 | Mollet . | |
| 4,874,935 | 10/1989 | Younger . | |
| 4,961,158 | 10/1990 | Sussman | 364/709 |
| 5,015,830 | 5/1991 | Masuzawa et al. | 235/441 |
| 5,021,952 | 6/1991 | Nishimura et al. | 364/406 |
| 5,128,523 | 7/1992 | Diehl et al. . | |
| 5,233,547 | 8/1993 | Kapp et al. | 364/705 |
| 5,241,161 | 8/1993 | Zuta . | |
| 5,252,815 | 10/1993 | Pernet . | |
| 5,272,319 | 12/1993 | Rey | 235/379 |
| 5,276,317 | 1/1994 | Ozouf et al. . | |
| 5,286,957 | 2/1994 | Defrasne . | |
| 5,322,989 | 6/1994 | Long et al. . | |
| 5,331,138 | 7/1994 | Saroya . | |
| 5,379,344 | 1/1995 | Larsson et al. . | |
| 5,380,997 | 1/1995 | Hania et al. . | |
| 5,402,095 | 3/1995 | Janniere . | |
| 5,422,953 | 6/1995 | Fischer . | |
| 5,436,971 | 7/1995 | Armbrust et al. . | |
| 5,495,098 | 2/1996 | Pailles et al. . | |
| 5,515,031 | 5/1996 | Pereira et al. | 340/568 |
| 5,517,011 | 5/1996 | Vandenengel . | |
| 5,520,551 | 5/1996 | Broschard, III . | |
| 5,521,966 | 5/1996 | Friedes et al. . | |
| 5,530,232 | 6/1996 | Taylor . | |
| 5,533,126 | 7/1996 | Hazard . | |
| 5,534,857 | 7/1996 | Laing et al. . | |
| 5,554,840 | 9/1996 | Saroya . | |
| 5,559,313 | 9/1996 | Claus et al. . | |
| 5,559,317 | 9/1996 | Wong et al. . | |
| 5,594,233 | 1/1997 | Kenneth et al. . | |
| 5,599,203 | 2/1997 | Broschard, III . | |
| 5,629,508 | 5/1997 | Findley, Jr. et al. . | |
| 5,633,490 | 5/1997 | Vandenengel . | |
| 5,649,118 | 7/1997 | Carlisle et al. . | |
| 5,653,610 | 8/1997 | Broschard, III . | |
| 5,653,617 | 8/1997 | Seidler . | |
| 5,663,553 | 9/1997 | Aucsmith . | |
| 5,667,397 | 9/1997 | Broschard, III et al. . | |
| 5,667,408 | 9/1997 | Broschard, III et al. . | |
| 5,679,007 | 10/1997 | Potdevin et al. . | |
| 5,689,100 | 11/1997 | Carrithers et al. . | |
| 5,728,998 | 3/1998 | Novis et al. | 235/380 |
| 5,748,737 | 5/1998 | Daggar | 380/24 |
| 5,775,398 | 7/1998 | Siegel | 150/139 |
| 5,777,903 | 7/1998 | Piosenka et al. | 364/700 |

FOREIGN PATENT DOCUMENTS

| | | | |
|---|---|---|---|
| 0 168 836 | 7/1985 | European Pat. Off. | G07F 7/08 |
| 2 616 938 | 6/1987 | France | G06K 7/00 |
| 2 619 463 | 8/1987 | France | G06K 19/00 |
| 2 633 750 | 7/1989 | France | G06K 7/00 |
| 2 653 249 | 10/1989 | France | G06K 19/067 |
| WO 97/15551 | 12/1990 | WIPO | 11/18 |

*Primary Examiner*—James P. Trammell
*Assistant Examiner*—Yehdega Retta
*Attorney, Agent, or Firm*—Foley, Hoag & Eliot LLP

[57] ABSTRACT

A valet for a electronic card is provided through which a user may track and tally transactions via speed nodes that relate to predetermined spending categories and that permit the user to assign budget amounts to each such category. The valet may include means for securing a card, a balance reader, data processing means, memory, data transfer means, and security means.

30 Claims, 15 Drawing Sheets

_(6,014,648)_

ELECTRONIC CARD VALET

CROSS-REFERENCE TO RELATED APPLICATIONS

This application is based on U.S. Provisional patent application Ser. No. 60/026,247, filed Sep. 17, 1996.

BACKGROUND OF THE INVENTION

1. Field of the Invention

This application relates to the field of smart cards and more particularly to the field of devices used in conjunction with smart cards to increase the usefulness of electronic cards, including smart cards, to users.

2. Description of Related Art

A Smart Card is a plastic card with an embedded microchip that allows its owner to use the Smart Card as a substitute for cash in purchasing a wide variety of goods and services. Smart Cards are well known and have enjoyed wide commercial success, particularly in Europe and Australia. The innovation of the smart Card is that it can be programmed to store a numerical value equaling a prepayment in cash by its owner and to deduct expenditures from the monetary value until the value is expended. Thus, the Smart Card provides the convenience of a credit card, but does not require pre-qualification as to credit history, income, or the like. At any one time, a "Smart" Card can store a value of any monetary amount.

A further advantage of the Smart Card is that it eliminates the need to verify the owner or the credit status and compliance of the user. It is simply used until the prepaid funds are expended, or until cash is again pre-paid to allow its owner to use once again as a cash alternative. The Smart Card microchip simply subtracts the cost of the financial transactions until a zero balance is shown. Then the owner pre-pays a new amount, and the Card is activated again. A Smart Card is typically activated by a personal PIN number to protect the owner from theft; thus, the Smart Card is of no value to anyone except the owner, who possesses the PIN number.

A further characteristic of the Smart Card is that, as with cash transactions, no individual record of types of purchase is identified, allowing for the privacy of one's own transactions. Thus, the Smart Card provides the privacy of cash, but the safety and convenience of credit cards. In some countries, such as France, the Smart Card is a cash alternative for a wide range of goods and services, including telephone calls, highway tolls, retail store purchases, restaurant charges and taxicab charges.

The enhanced privacy of the Smart Card is not without certain disadvantages. In particular, by nature of its intended purpose, the Smart Card does not provide for the availability of paper receipts, monthly statements or any other typical form of tracking or tallying financial transactions, such as in the case of credit card transactions. This necessary limitation leaves a critical gap in what has come to be a standard expectancy of consumers, who, in their history of using common and widely-used purchasing mediums (credit cards, personal checks, ATM cards, etc.), have come to rely on the generation of accounting records of transactions by the entity that provides the purchasing medium. Thus, a need has arisen for a device that can offer users of the Smart Card or other microchip-embedded electronic cards the multiple conveniences of complete user privacy, ongoing tracking and tallying of purchases, and user-directed accounting in their financial transactions.

SUMMARY OF THE INVENTION

A valet for an electronic card is provided, comprising a container for receiving and securing the electronic card, memory for storing data, a balance reader, for reading data stored in the electronic card, wherein the balance reader comprises memory for storing data, data transfer means, for transferring data from the electronic card to the memory, data retrieval means, for retrieving data from the memory, and display means, for displaying the balance of the electronic card, data processing means, for manipulating the information in memory, wherein the data processing means comprises an application specific integrated circuit, display means, for displaying data output by the data processing means and speed nodes, capable of identification, classification and tallying of individually-specified purchase types, wherein the activation of a speed node prior to a transaction identifies the transaction as associated with a particular classification and causes the amount and classification of the transaction to be stored in memory.

The present invention also provides a method for tracking transactions made by a electronic card, comprising providing a container for a electronic card, providing a balance reader, for reading data stored in the electronic card, providing memory for storing data, providing a display, for displaying data output by the balance reader and providing speed nodes, capable of identification, classification and tallying of individually-specified purchase types, wherein the activation of a speed node prior to a transaction identifies the transaction as associated with a particular classification and causes the amount and classification of the transaction to be stored in the balance reader.

Also provided is an electronic card valet, comprising a plurality of speed nodes, each speed node associated with a budget and a total for a category of transaction, each speed node capable of tracking the budget and the total upon a transaction of the electronic card in the category.

The present invention offers users of a smart card or other microchip-embedded electronic cards the ability to track, tally and direct accounting of financial transactions entered into using such cards. An embodiment of the invention offers an exact usermatch for one type of Smart Card, known as the Moreno "Smart" Card; however, the invention provides utilities and conveniences that are of benefit and value to all major national and international purveyors of electronic cards.

The present invention relates to an electronic device for the adding, deleting, tracking, tallying, grouping, sub-grouping, organizing and transferring of electronic financial transactions and the creation and maintenance of a personal financial history derived from a single, concurrent and/or consecutive use of the Smart Card or any other microchip-imbedded electronic cash card or electronic credit card used as an alternative to cash purchasing through an electronic mode and/or electronic interactivity between the electronic cash card and the present invention.

In an embodiment of the invention, the present invention can also provide a means of accounting complex personal financial transactions or business financial transactions, and with the use of an electronic transfer card, transfer data to a personal computer or its equivalent.

It is an object of the present invention to provide a structured device by which to locate a microchip-embedded credit card or charge card or standard electronic userspecified card and provide information through electronic interaction identified as designated outcomes that can be retrieved visually through a display window or downloaded to a personal computer or its equivalent.

It is another object of the present invention to compensate users of "Smart" Cards or other electronic credit cards who may wish to have or gather on a regular basis the identification, allotment and distribution, per user-specified categories, of their history of card or "cash-less" purchasing that is presently not available to them as card holders.

It is a further object of the invention to permit users to budget for specific categories of transaction, by assigning sub-balances of a Smart Card balance to such categories.

It is yet a further object of this invention to ensure consumer privacy in their purchasing practices while enjoying the convenience of payment by electronic card.

It is still a further feature of this invention to provide a personalized, tailored, and user-friendly "cash-less" payment system.

It is another object of the invention to provide an electronic card container that is simple to use and can be handheld and can be easily carried by the person.

It is thus a feature of this invention to provide a complete user-specified accounting of financial transactions and transfer this information by electronic means to another location.

It is yet another feature of this invention to provide slots and plastic windows which may hold, store or contain purchase receipts, invoices, purchase orders, and other personal or business-related papers as well as the user's personal identification cards and other types of cards.

It is still further feature of this invention to offer the device itself in smaller or larger form, according to the users' need for purchase categorization.

DETAILED DESCRIPTION OF THE PREFERRED EMBODIMENT(S)

Figure 1:
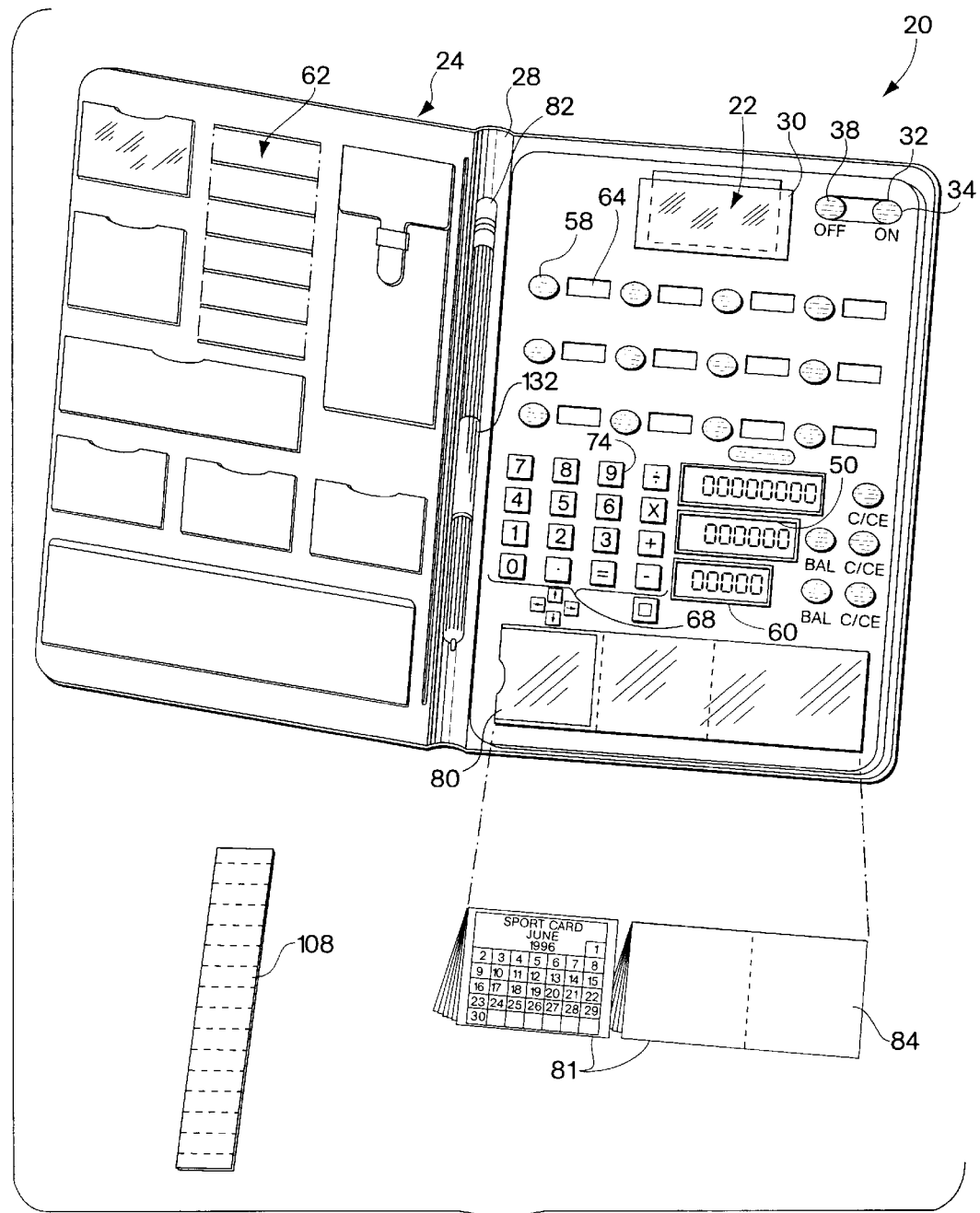
FIG. 1 is a front facial view of the present invention in a bi-fold embodiment.

Referring to FIG. 1, a valet 20 is provided, for holding a smart card 22. Uses of the term "smart card" should be understood in the following text and claims to refer to any microchip-embedded electronic card. The valet 20 comprises a container 24, which includes a fold 28, means for securing the smart card in the container 30, an activation button 32, the activation button 32 having an on position 34 and an off position 38. The valet 20 further includes a display 50, speed nodes 58, a speed node display 60, means for storing other cards 62, a set of speed node identification tabs 64, data entry means 68, the data entry means comprising a calculator keyboard 70, a calculator 74, receipt slots 78, means for receiving a calendar 80, a calendar 81, and means for recording a transaction record, comprising a pen 82, and a notebook 84.

Figure 2:
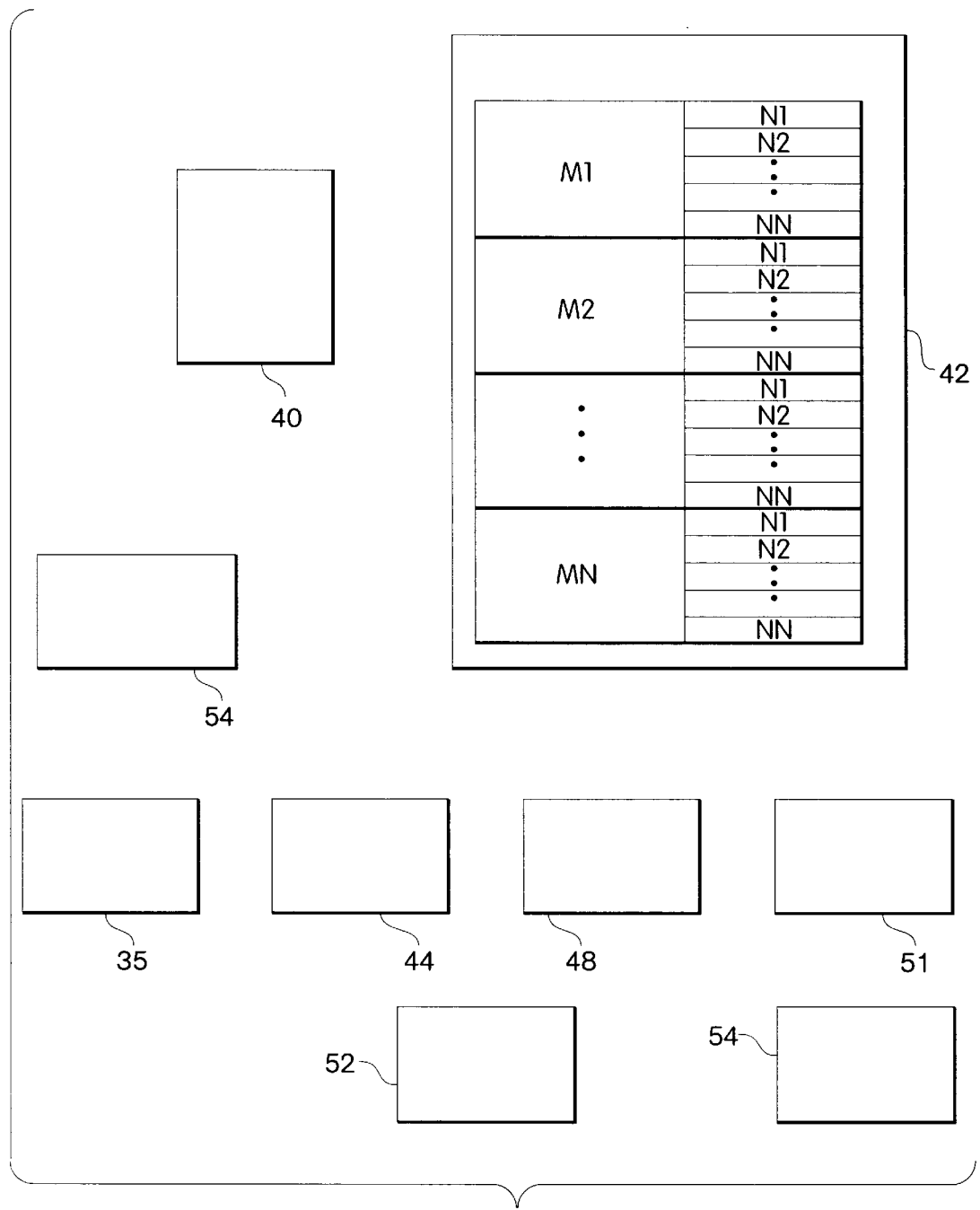
FIG. 2 is a schematic diagram of the internal electronic components of the present invention.

Referring to FIG. 2, a schematic of the internal electronics of the valet 20 is shown. The electronics include a balance reader 40, memory mean 42, data transfer means 44, data retrieval means 48, display generating means 51, data processing means 52, and a chip 54, the chip comprising an application specific integrated circuit. The electronics may also include a means for providing user privacy 88, a microchip responsive to a personal identification number 90. The electronics may further include a storage chip 180 for long term storage of items in memory.

Figure 3:
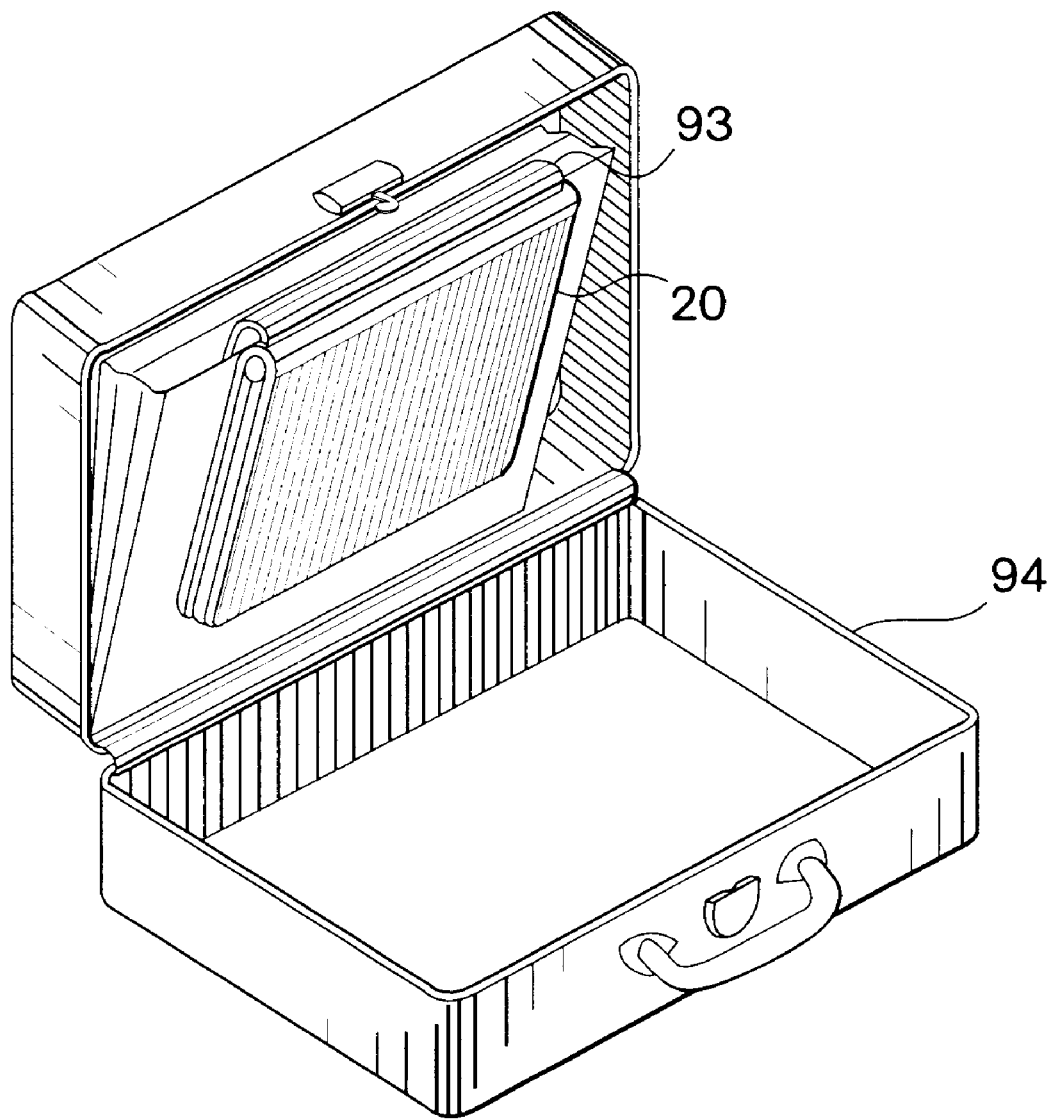
FIG. 3 is a view of an embodiment of the invention in which the invention may be attached to a briefcase.
Figure 8:
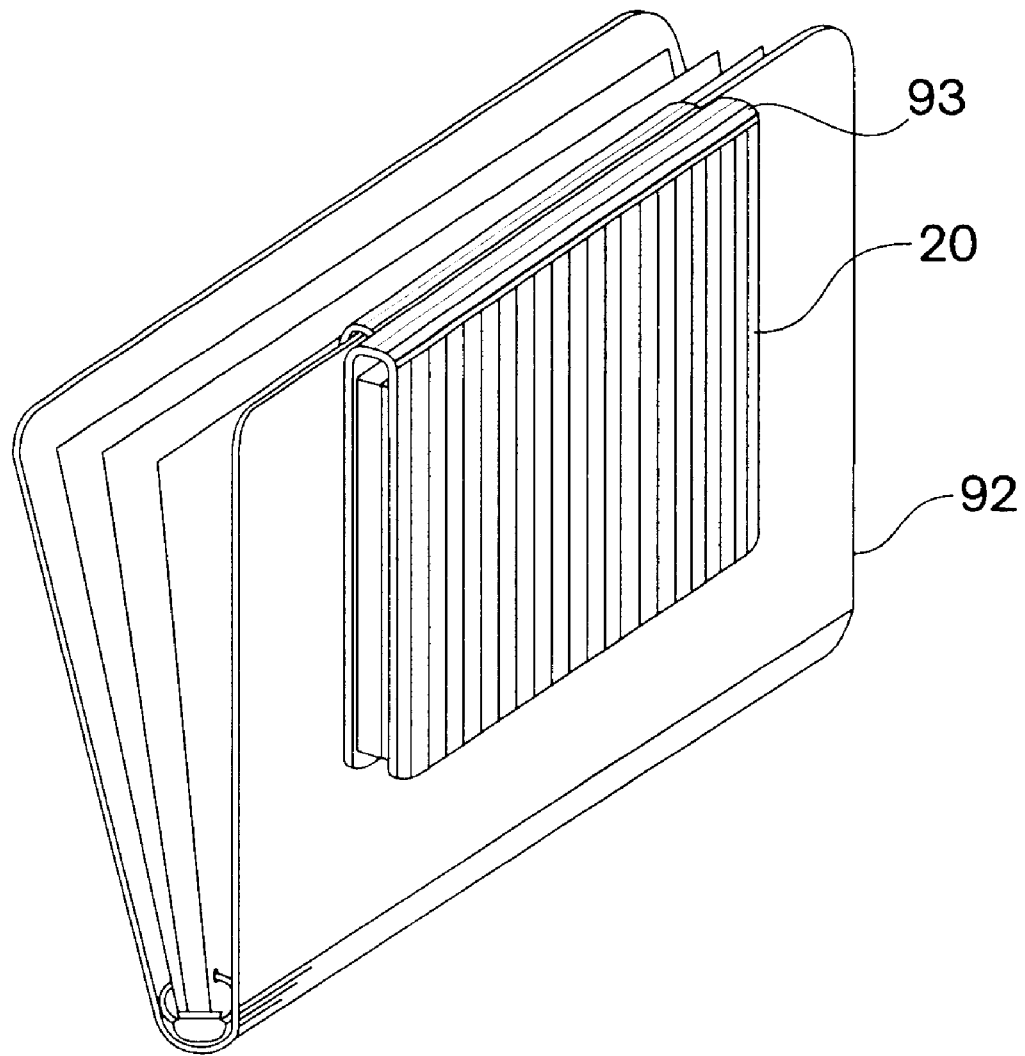
FIG. 8 is a view of the invention suitable for attachment to a filofax.

Referring to FIG. 3 and FIG. 8, embodiments of the invention may further include a clip 93 for attachment onto a briefcase 94 or a filofax 92.

Figure 7:
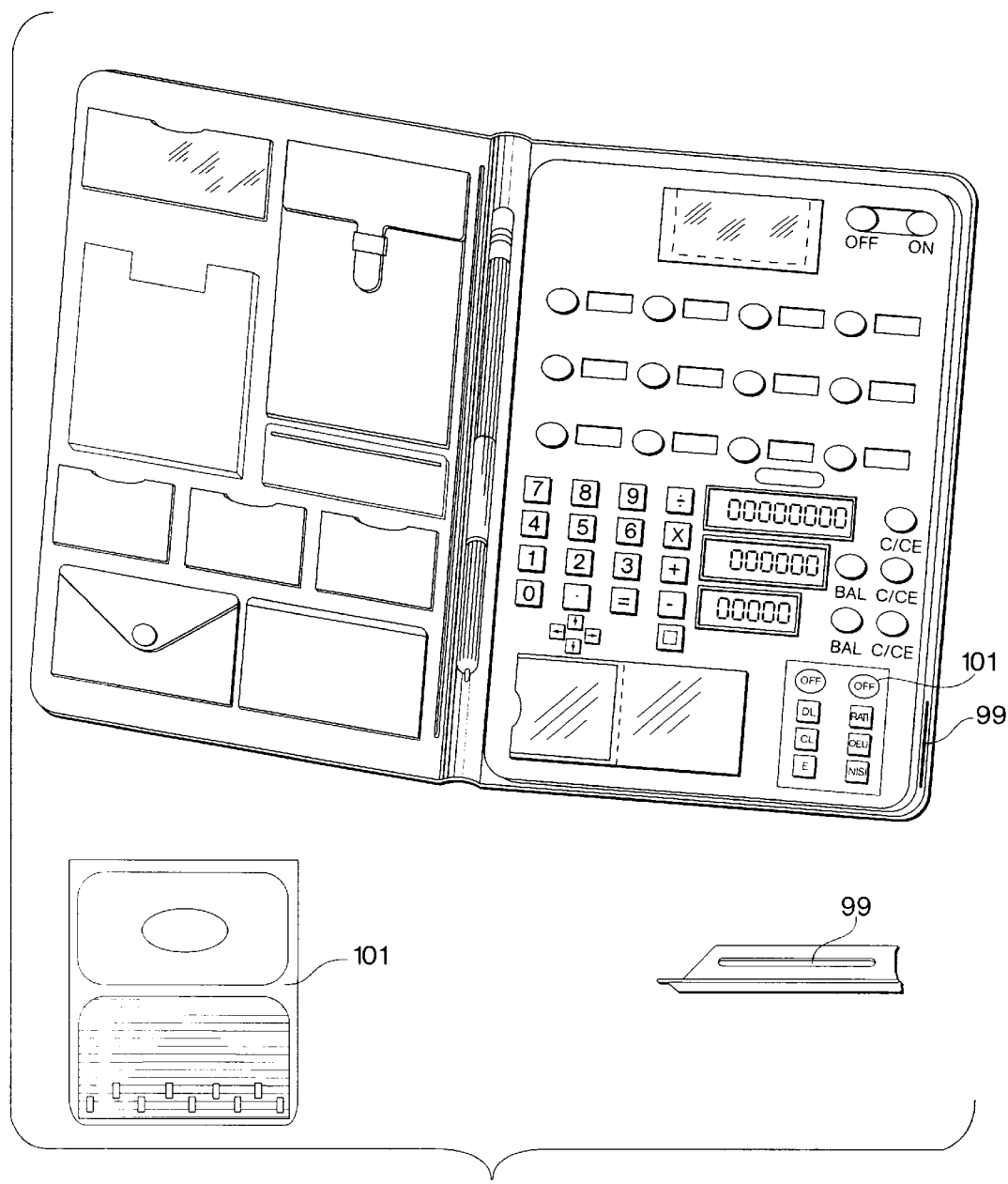
FIG. 7 is a view of an embodiment of the invention suitable for interface with a personal computer.
Figure 15:
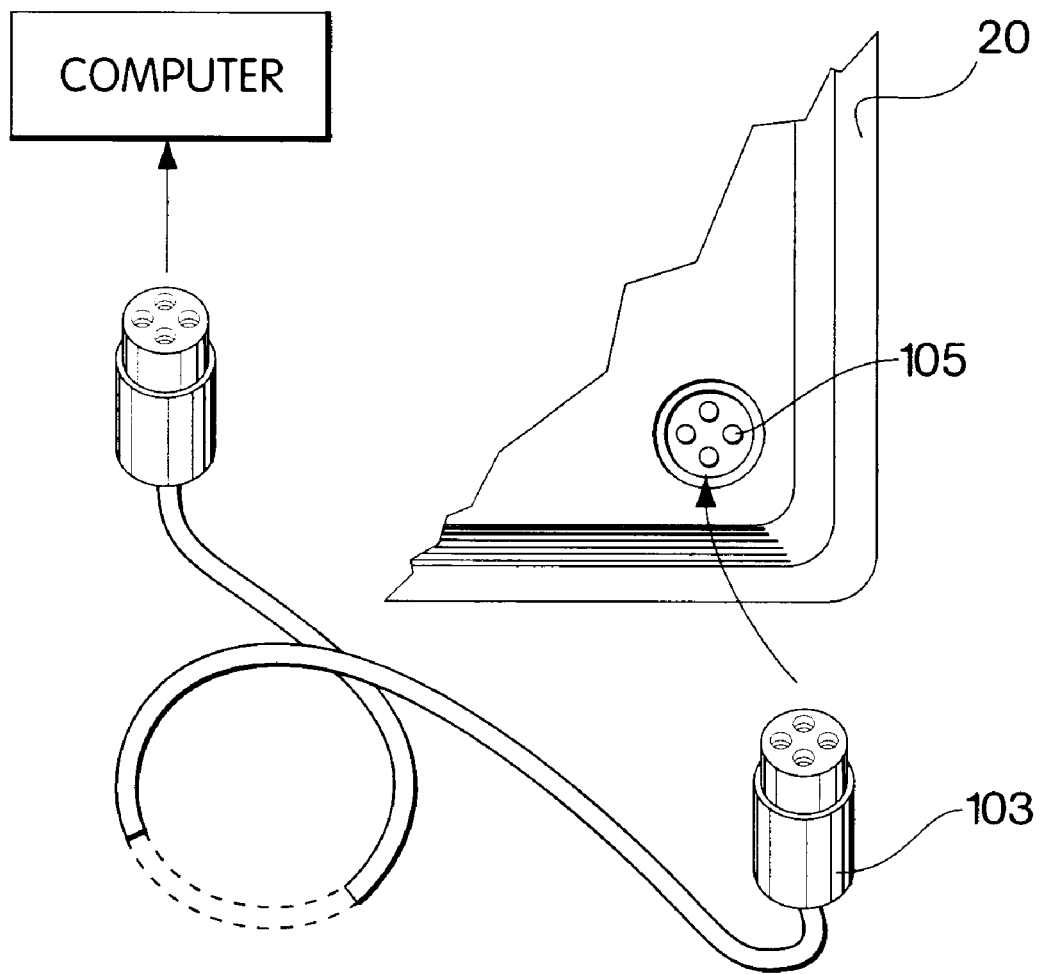
FIG. 15 is a view of an alternative embodiment of the interface to a personal computer.

Referring to FIG. 7 and FIG. 15, embodiments may also include an interface 97 to a computer 98. The interface 97 may comprise a conventional slot 99 for receiving a conventional diskette 101, an electronic transfer card 102, or a standard input/output cable 103 connected to an input/output slot 105 located in a corner of the valet 20, as in FIG. 15.

Figure 4:
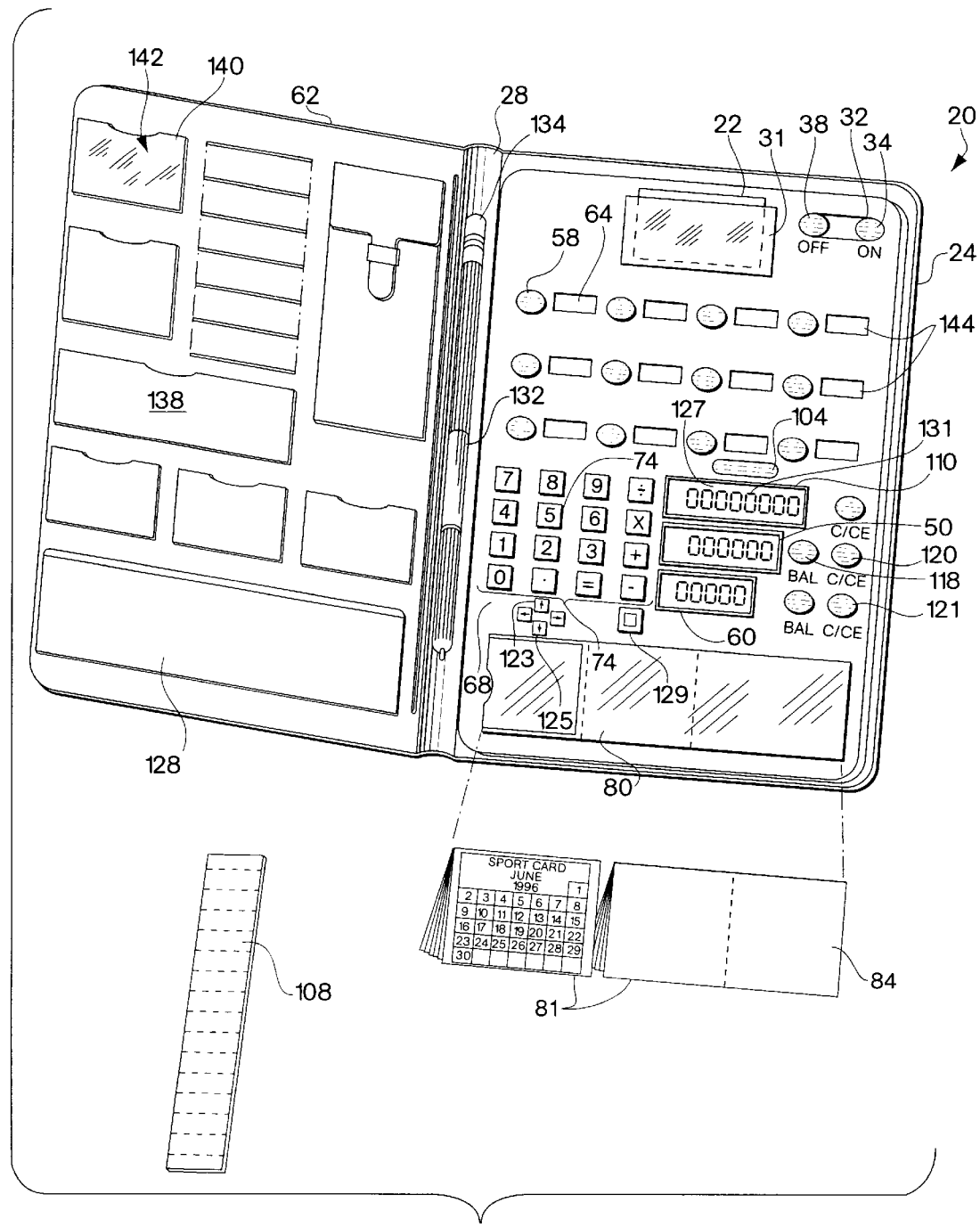
FIG. 4 is a detailed view of the front of an embodiment of the present invention.

Referring to FIG. 4, further details of the structure of the invention may include a calculator on/off button 104, identification tabs 108, a calculator display window 110, a speed node display window 60, a smart card display window 50, a balance button 118, a correction button 120, a cancel button 121, a card holder 122, notebook 84, a currency slot 128, a large receipt slot 130, a pen holder 132, a second card slot 138, a protected slot 140, a protective cover 142, made of clear plastic, and speed node identification tabs 144.

The present invention may further include a tri-fold container, a four-fold container, or a six-fold container. In other embodiments, the invention may include an accordion fold, a fold-over fold, or magnetic latch strips. The latch strips may include a latch lock.

Figure 6:
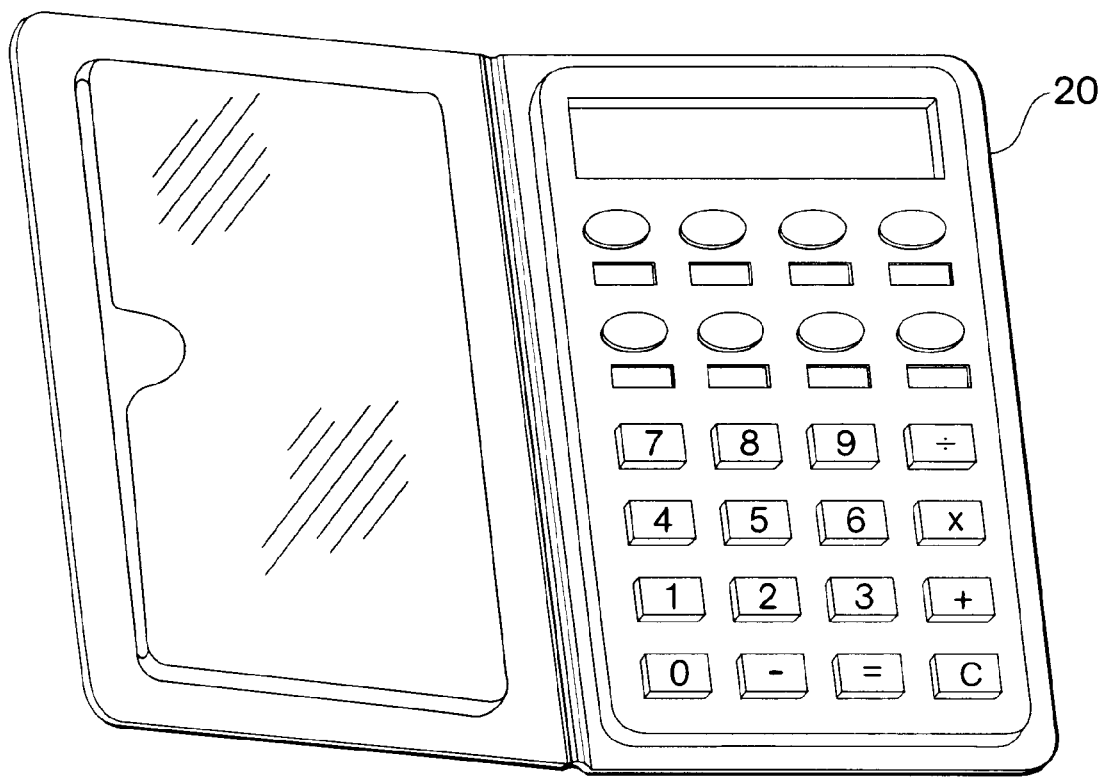
FIG. 6 is a view of a reduced-size embodiment of the present invention.

Referring to FIG. 6, a reduced size, or "baby valet" version of the valet 20 may be provided. The features of the baby valet are similar to those depicted for the valet 20 of FIG. 1; however, certain features may be omitted, such as the large receipt slot, the notebook, the pen, or the like.

Figure 13:
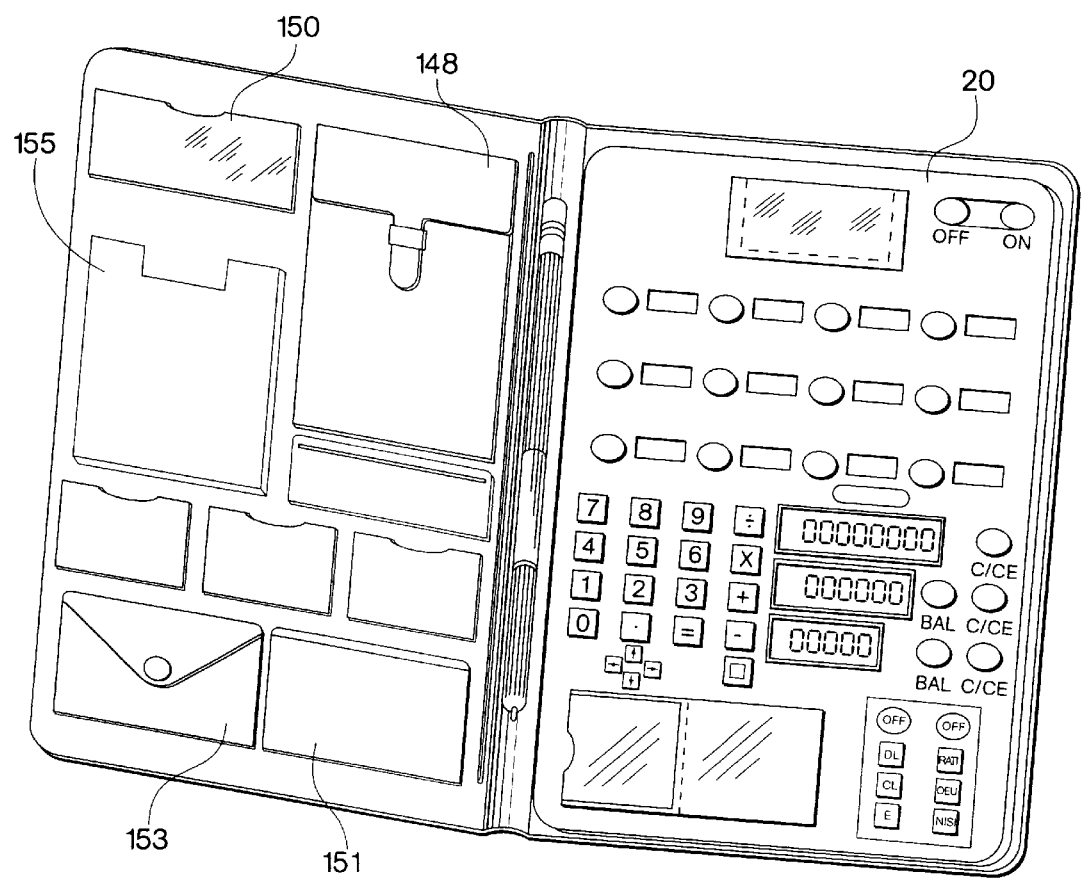
FIG. 13 is a view of an embodiment of the invention adapted for use by frequent travelers.

Referring to FIG. 13, a variation of the valet adopted for traveler's use, the "traveler's valet" is depicted. The features of the conventional valet may be provided, but certain receipt slots may be replaced by a slot 148 for a passport, a slot 150 for an international driver's license, a slot 151 for a driver's license, a coin purse 153 and a slot 155 for an electronic translator.

Referring to FIG. 7, in an embodiment of the invention, a data interface 164 is provided to a personal computer (not shown). A computer diskette 101 is provided, and a diskette slot 99 is provided for the diskette 101. A data transfer on/off button 174 is provided.

Figure 5:
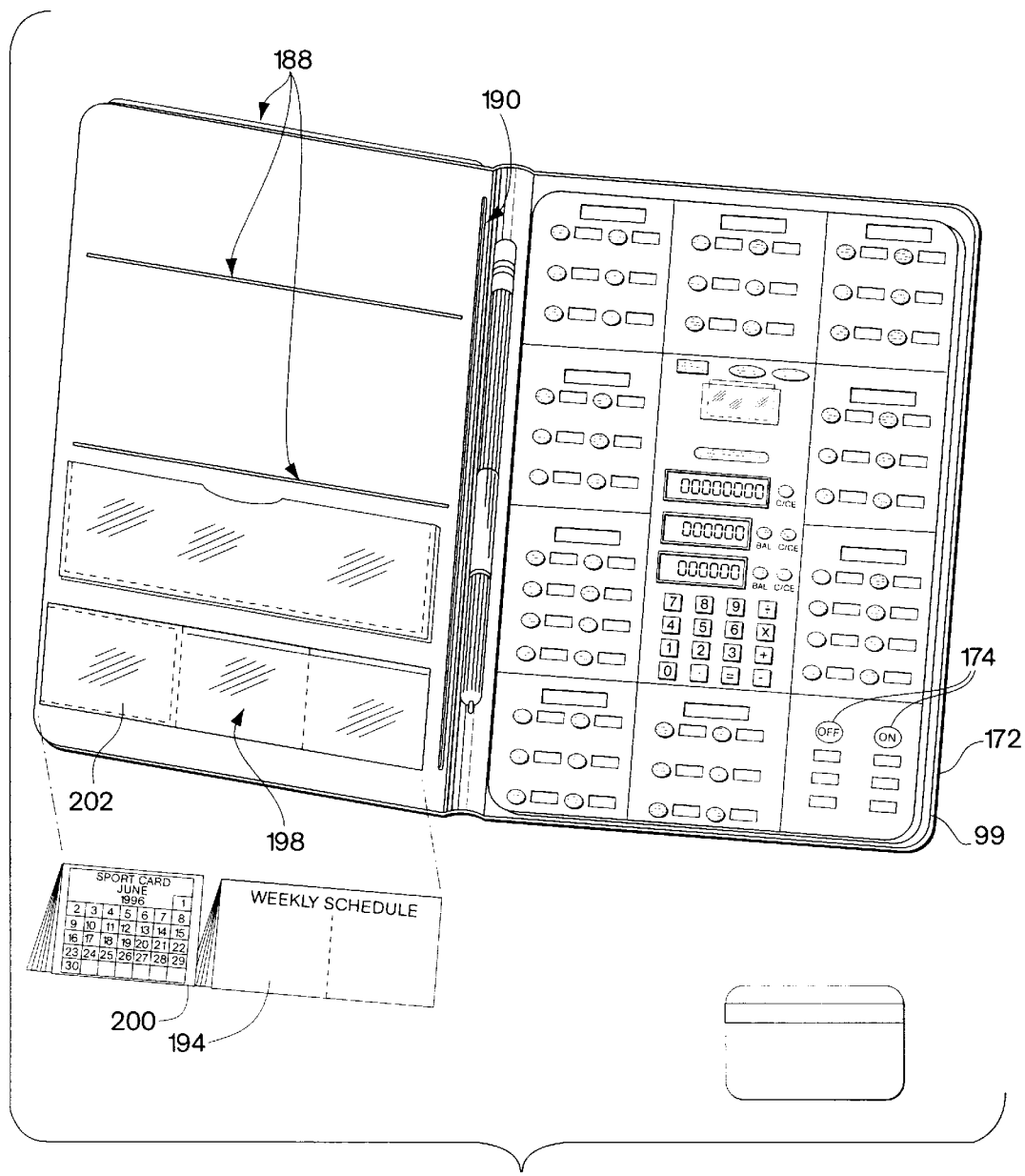
FIG. 5 is a front facial view of the present invention in an embodiment adapted for the special demands of business use.

Referring again to FIG. 5, the device may include wide slots 188, a vertical slot 190, horizontal slots 192, a schedule 194, a schedule holder 198, a calendar 200, a calendar holder 202, and an internal frame 182.

Referring again to FIG. 4, the valet 20 is provided, for holding the smart card 22. The valet 20 comprises a folding container 24 similar to a notebook binder or a wallet. The container 24 can come in a variety of sizes, and may be made of any conventional material, such as vinyl, leather, or plastic. The valet 20 may include the fold 28, and may include any number of folds 28, depending on the number of features desired by the user. The means for securing the smart card in the container 30 may be any conventional means, such as a card slot 31. Prominently displayed on the valet 20 is an activation button 32, the activation button 32 having an on position 34 and an off position 38, which activates the valet 20. The external portion of the valet 20 further includes a display 50, which may be a light emitting diode, liquid crystal display, or similar display, such as those used on conventional calculators. The container 24 also includes the speed nodes 58, each of which is associated one of the speed node identification tabs 64. The speed node identification tabs 64 may be pre-printed or may be left blank for completion by the user. Each speed node identification tab 64 includes a category of transaction, selected from the categories that are typically engaged in using a smart card; thus, a speed node identification tab 64 might identify owner-specified cost items, i.e., food purchases, item costs for income tax-deduction tracking, or purchases or fees related to automobile use, general business use, employee service delivery, employee expenses, etc. Each speed node identification tab 64 may be a hard paper strip, which could be blank and pre-printed. The valet 20 may include any number of speed nodes 58, constrained only by the size of the container 24 and the number of desired categories. The speed nodes 58 comprise buttons that are activated by pressing. Pressing a speed node 58 instructs the electronics of the valet 20 to initiate the functions that relate to the speed node 58.

Referring again to FIG. 2, the valet includes the memory 42, which includes a number of addresses 47, represented by M1, M2, . . . , MN in FIG. 2, each address corresponding to particular speed node 58, to the balance of the smart card, or to the functions of the calculator 74. The memory 42 is capable of storing a series of numerical values N1, N2, . . . , NN that are assigned to each speed node 58. The numerical values may represent the historical sum of the monetary transactions assigned to the speed node, the sum of such transactions conducted during a particular time period, the amounts of the most recent transaction or transactions, the current monetary balance of the card, the current sub-balance of the card that is assigned to a particular speed node 58 that is budgeted for spending in a particular category, or similar data. Initiating the speed node 58 calls up the address 47 of the speed node 58 from memory 42. Further instructions may permit the user to read the information relevant to the speed node 58 from the memory address 47 of the memory 42, such as the current balance, to correct or adjust the balance by entering a number via the data entry means 68, or to assign a transaction that has been executed or is to be executed to the speed node 58. Assignment of a transaction to a speed node 58 causes the amount of the transaction to be deducted from the balance assigned to that speed node 58 for budgeting purposes and adds the amount of the transaction to the historical tally of transactions executed in the category identified by that speed node 58. In each case, adjustments are made to the numerical values stored in the memory addresses 47 associated with the speed node 58 in the memory 42. Use of the budgeting function allows the user to limit spending in particular categories; thus, the user may allocate an initial budget to the speed node 58, for a particular category, such as restaurant meals. when the budget allocated to that category is expended, the balance for the speed node 58 will be reduced to zero. The user can thus conveniently track the personal or company budgeting process through the smart card valet.

Referring again to FIG. 4, the valet 20 further includes the speed node display 60, which may also be a light emitting diode, liquid crystal display, or other conventional display means. The speed node display 60 is capable of displaying a number representing the monetary balance retained in the memory address 47 in the memory 42 that is associated with a particular speed node 58.

Referring to FIG. 1, the valet 20 may further include the means for storing other cards 62, which, in an embodiment of the invention, may comprise slots similar to those used in conventional wallets for holding credit cards, driver's licenses, or similar items.

The valet 20 may further include the data entry means 68. In an embodiment of the invention, the data entry means may comprise a keyboard 70, which forms part of a calculator 74. The calculator 74, with keyboard 70, may be an integral part of the smart card valet, or it may be a separate component that is secured to the valet.

The valet 20 may further include the receipt slots 78. The receipt slots 78 are preferably configured to hold receipts of varying sizes, such as ATM receipts, credit card receipts and the like. The receipt slots 78 may be used to store receipts from the use of credit cards, ATM cards and other electronic cards that are stored in the valet 20, so that the valet 20 may serve as a single location for all electronic cards and for all associated receipts and records of financial transactions executed using such cards.

The valet 20 may further include means for receiving a calendar 80, into which a calendar 81 may be inserted. The calendar 80 permits the user to use the valet 20 for personal planning, as well as for tracking financial transactions. The means for receiving 80 may include a horizontal slot, triangular corner slots, or other conventional means for securing a paper item such as the calendar 80 to the container 24.

The valet may further include conventional means for recording a transaction record 82, such as the notebook 84. Thus, any information not stored on receipts or in the memory 42 of the valet 20 can be recorded on the notebook. The notebook 84 further contributes to the utility of the valet 20 as a general personal organizer.

Figure 14:
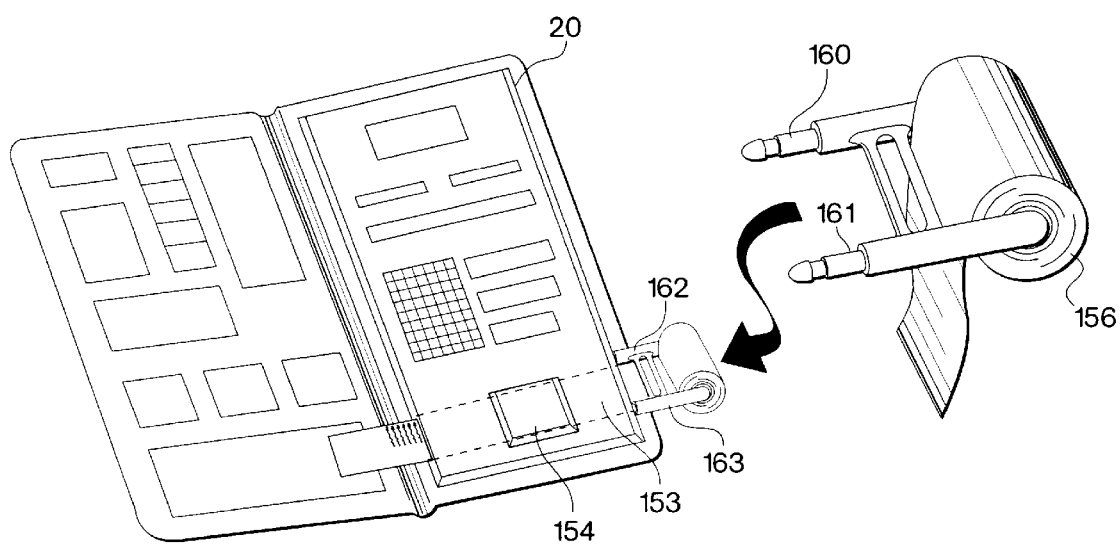
FIG. 14 is a view of a receipt generator for the present invention.

Referring to FIG. 14 the valet 20 may include a receipt generator 153, comprising a printer 154 and a roll of paper 156 that is detachably connected to the valet 20 by a pair of pins 160, 161 that may be disposed in a pair of slots 162, 163 on the valet 20. The printer 154 may be any conventional printing device that is connected to the memory 42. Thus, the valet 20 may be equipped to print a receipt for any transaction.

Referring to FIG. 2, a schematic of the internal electronics of the valet 20 is shown. The electronics include the balance reader 40, which is a conventional smart card balance reader, such as that disclosed in U.S. Pat. No. 5,594,233, Multiple Standard Smart Card Reader to Kenneth and Mahsoula. The disclosure of U.S. Pat. No. 5,594,233 is incorporated by reference herein. The balance reader 40 is configured to interface with the smart card, so that the balance of the smart card may be retrieved and delivered to the memory means 42 and displayed on the display 50. The electronics further include conventional data transfer means 44, such as electronic circuits, which permit the electronic connection and data interface of the smart card, the memory 42, the display generating means 51, the data processing means 52, and the chip 54. The data transfer means 44 also are connected to the data input means 68, the calculator 74, and the speed nodes 58, so that, when the valet 20 is activated, pressing buttons located on such items results in a corresponding signal to the chip 54, which directs the operation of the electronic components. The chip 54 may comprise an application specific integrated circuit which is manufactured and programmed by conventional means to perform the functions of the valet 20 described more particularly below. FIG. 2 identifies the primary electronic components of the internal valet 20. The components may be connected by conventional electrical circuit components by conventional means.

The electronics may also include the means for providing user privacy 88, which may include an encryption algorithm that prevents activation of the chip 54 until the user enters a correct personal identification number 90 via the keyboard 70. The means for providing user privacy 88 may further include an encryption algorithm, programmed into the chip 54, that causes the chip 54 to refuse to execute a financial transaction if an incorrect personal identification number 90 is entered a predetermined number of times, thus, reducing the possibility that the encryption algorithm can be circumvented by approaches that rely on repetitive entry of multiple personal identification numbers until a correct number is obtained.

Referring to FIGS. 3, 7, 8 and 15, an embodiment of the invention may further include the means for attachment onto a filofax 92, the means for attachment onto a briefcase 94, and the means for interface to a computer 98. In the embodiment of the invention that includes the means for interface to a personal computer (not shown), the invention includes the means for transferring data from the valet 20 to the computer, which may be any conventional means, such as the diskette 101 or the input/output cable 103. These embodiments of the invention permit the valet 20 to operate with other conventional tools of personal organization. In particular, the computer embodiment permits the transfer of data from the memory 42 of the valet 20 to the computer, which permits the user to retrieve, store and manipulate the data with conventional financial computer software programs.

Referring to FIG. 4, further details of the structure of the invention may include the calculator display window 110, the speed node display window 60, and the smart card display window 50. The windows 110, 50, and 60 permit the user to view numerical amounts retrieved from the smart card and the memory 42. The calculator 74 may have separate memory 43 and processor 45, which are also connected to the display window 110 and to the memory 42 and chip 54 by conventional data transfer means 44.

The valet 20 further includes the balance button 118, which may instruct the electronics of the valet 20 to obtain the balance of the smart card via the balance reader 40 and to display the balance on the smart card display window 110. The balance button 118 may also be used in conjunction with pressing a speed node 58 to instruct the electronics to retrieve from the memory address 47 in memory 42 the numerical balance currently assigned to a particular speed node 58. The balance button 118 and speed nodes 58 may be programmed to permit the order or duration of the pressing of the buttons to indicate which data from the memory 42 is intended to be displayed. For example, pressing the balance button 118 in conjunction with a long press of the speed node 58 could cause the valet 20 to retrieve and display on the speed node display window 60 the current balance of available funds that are assigned in the memory address 47 to the identified speed node 58. Alternatively, pressing the balance button 118 in conjunction with a short press of the speed node 58 could cause the valet 20 to retrieve from memory 42 and display on the speed node display window 60 the sum of the numerical amounts of the historical transactions assigned to that speed node. The valet 20 may also be programmed to permit the user to enter a range of dates via the data entry means 68 after pressing the balance button 118 and the speed node 58, so that the valet 20 may retrieve from the memory 42 and display on the speed node display window 60 the sum of the transactions assigned to the pressed speed node 58 during the entered range of dates.

The valet 20 may further include the correction button 120, which, when pressed along with a particular speed node 58, may be used to correct the data assigned to a particular memory address 47 of the speed node 58. The duration and timing of the press may be used to select different modes of correction. For example, pressing the correction button 120 simultaneously with a long press of the speed node 58 may instruct the valet 20 to replace the data in the memory address 47 assigned to the speed node 58 that indicates the historical sum of all transactions executed with the speed node 58. By correcting multiple speed nodes 58, the user may thus move a given transaction from one speed node to a different speed node. In an embodiment of the invention, a move button 121, when pressed, followed by pressing two speed nodes 58 in sequence, would move an amount entered by the data entry means 60 from the memory address 47 of the first speed node 58 to the corresponding memory address 47 of the second speed node 59. Alternatively, the valet 20 could be programmed to display graphical menus on the display 50 or the speed node display 60, whereupon the functions described herein or similar functions could be selected by providing up and down arrow buttons 123, 125, a cursor 127, and an enter button 129, whereby pressing the arrow buttons 123, 125 would move the cursor 127 to a menu item 131, and pressing the enter button 129 would cause the function indicated by the menu item 131 to be executed.

The valet 20 may also include the cancel button 121, which causes the valet 20 to cancel any current function.

The exterior of the valet 20 may include a number of other features that are designed to improve the utility of the device as a personal organizer and financial planner. Thus, the card holder 62, the notebook 84, the currency slot 128, the large receipt slot 130, the pen holder 132, the pen 134, the second card slot 138, the protected slot 140, and the protective cover 142 all provide additional conventional functions. All of these items may be of the conventional type and may be made of conventional materials.

The present invention may further include a number of different overall structures for the container 24. Thus, the valet 20 may consist of a tri-fold container, a four-fold container, or a six-fold container. In other embodiments, the invention may include accordion fold, a fold-over fold, or magnetic latch strips. The latch strips may include a latch lock. The number of folds, type of folds, and type and number of latches may be modified according to the preference of the user.

Referring to FIG. 7, the personal computer embodiment of the invention is further described. The data interface 99 provided to a personal computer (not shown). The interface 99 may be any conventional means, such the computer diskette 101 or an input/output cable 103, as shown in FIG. 15. The card slot 99 is provided for the diskette 101. The data transfer on/off button 174 initiates the operation of the interface 99.

Referring to FIG. 2, the data transfer card 170 is electrically connected to the memory 42 by the data transfer means 44, so that the data in the memory 42 can be transferred to the memory of the personal computer. Once in the personal computer memory, the data may be manipulated by any conventional computer software program, such as a program for tracking financial transactions.

Figure 9:
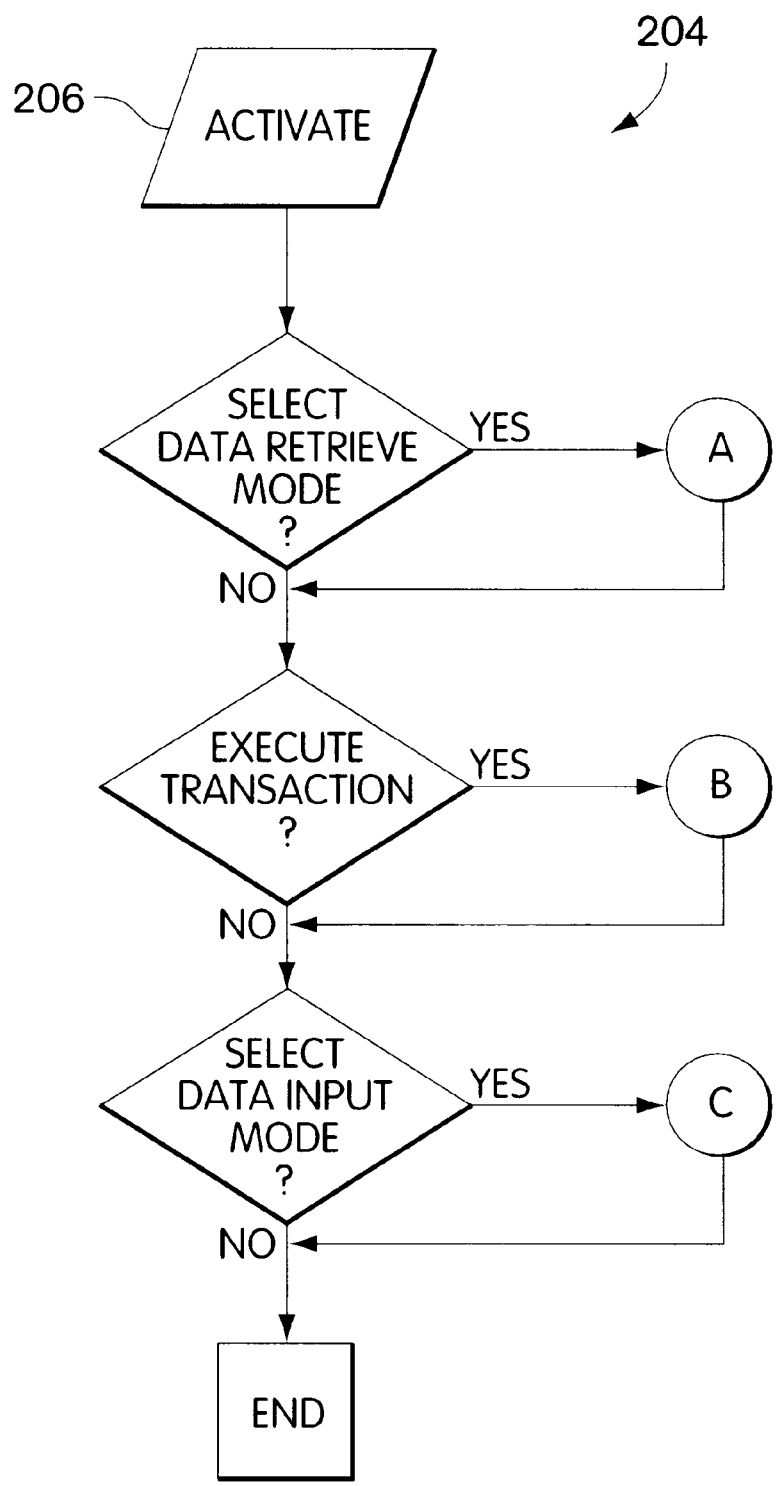
FIG. 9 is a flow chart of the main steps of the operation of the valet.

Referring to FIG. 9, a flow chart 204 illustrates the main steps of the operation of the valet 20. The flow chart 204 connects to other flow charts (shown in subsequent figures and described below) using off-page connectors labeled A, B, . . . etc. The flow chart 204 combines with the other flow charts shown in the subsequent figures to illustrate the entire operation of the valet 20.

Referring still to FIG. 9, the flow chart 204 shows a first step 206 in which the user activates the valet 20. Activation is by use of the on/off button 32. Once the valet 20 is activated, a number of different operational modes are available to the user. The different operational modes are reflected by steps 208, 210, 212 and 214 of the flow chart 204. Step 208 reflects a step of selecting a data retrieval operational mode. Step 210 reflects a step of selecting a transaction execution operational mode. Step 212 reflects selection of a data input operational mode. The selection of an operational mode could be accomplished by a variety of conventional means, such as pressing a button dedicated to the operational mode, using up and down arrows and an enter key to select the mode from a list displayed on display means 50, or the like. In an embodiment of the invention, the operational mode is determined by the duration and sequence of pressing buttons dedicated to the valet 20 and the speed nodes 58.

Figure 10:
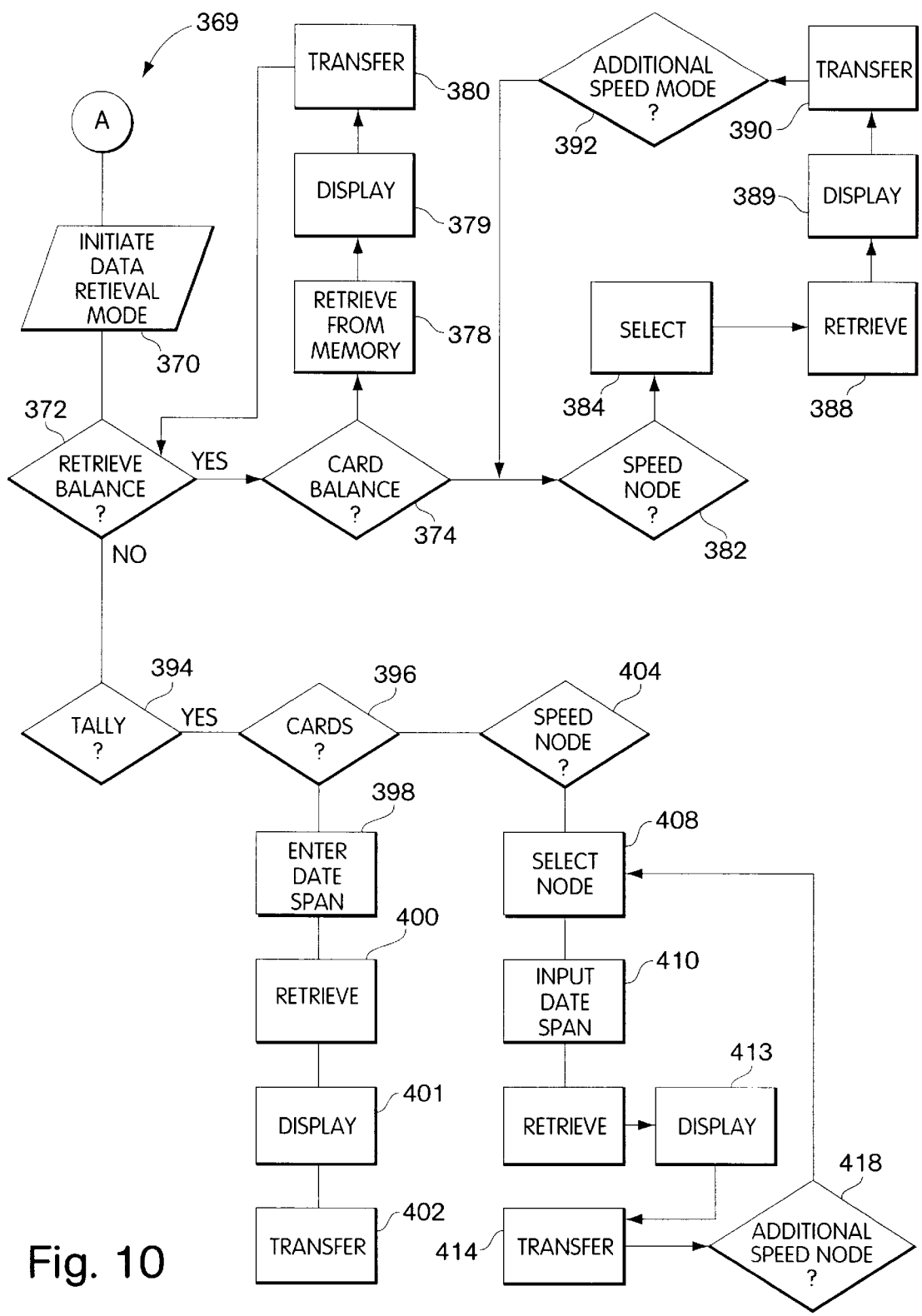
FIG. 10 is a flow chart of the steps of the data retrieval operational mode of the invention.

The operation of the valet 20 upon selection of the data retrieval operational mode at step 208 is reflected in FIG. 10. Off page connector A connects a flow chart 369 to the flow chart 204. The flow chart 369 that shows the steps of the data retrieval operational mode. The data retrieval operational mode includes an initial step 370 which constitutes the initiation of the data retrieval mode. The next step 372 prompts the user to indicate whether the user wishes to retrieve a balance from memory. If the user wishes to retrieve a balance, then the user selects the balance mode. Selection of a particular mode within the data retrieval operational mode may be accomplished by a variety of conventional means, such as selecting from a display menu or by pressing buttons in a predetermined sequence and duration. In the balance mode, in a next step 372 the user is prompted to identify whether the user wishes to retrieve from memory the balance of the card. If the card balance is selected at Step 374 the electronics of the valet 20 are instructed to retrieve from the balance reader 40 the balance of the Smart Card in a step 378. Next, in a step 379, the electronics are instructed to store the balance of the card in memory and to display the card balance on display means 50.

At a next step 380 the user is prompted to determine whether the user wishes to transfer data indicating the balance of the card from memory to a computer via the interface 98 which may be the electronic transfer card 102. If the user wishes to transfer the data then a transfer step 380 is completed. If the user does not wish to transfer the data, or upon completion of the transfer step 380, the user is returned to the step 370 to determine whether the user wishes to continue in the data retrieval operational mode.

If at step 370 the user wishes to proceed in the data retrieval operational mode, but at step 374 the user does not instruct the valet 20 to retrieve the card balance, the user is prompted to select a speed node 58. The speed node 58 is selected at a step 384. Selection of a speed node 58 may be accomplished by conventional means, such as pressing the button for the speed node in conjunction with pressing a button selecting the balance mode of operation, selection of the speed node 58 in a pull-down window, or the like. After selection of the speed node 58 at step 384, the electronics are instructed to retrieve from the memory means 42 the balance associated with that particular speed node 58. Balances are initially entered into the memory 42 as a result of the data input mode and are adjusted in that mode and in the transaction execution operational mode, both of which are more particularly described below. The balance for the speed node 58 is then displayed in a step 389 on the speed node display means 60. The user may then select a transfer step 390 in which the data is transferred by the electronic transfer card 102 and the interface 98 to a personal computer. If the transfer step 390 is not selected, or after completion of the transfer step 390, the user is prompted to determine in a step 392 whether additional speed nod(e balances are to be retrieved.

If the user desires to retrieve an additional speed node 58 at step 392, then the user returns to step 382 and is prompted to select a new speed node 58 at step 384. If the user does not wish to select an additional speed node 58 at the step 392, then the user is returned to step 370 to determine whether the user wishes to continue in the data retrieval operational mode. If the user does not wish to select a balance at step 372 then the user is prompted to proceed to a step 394 in which the user may obtain a tally of historical transactions. A first step 396 prompts the user to select whether the user wishes to obtain a tally of historical transactions for the entire smart card. If the user wishes to proceed with a tally for the card, then the user proceeds to step 398 in which the user is prompted to enter a span of dates with the data entry means 68. Once the span of dates is entered with the data entry means 68 at the step 398, in a step 400 the electronics retrieve from the memory 42 the tally of all transactions made with the card during the date span entered by the data entry means 68. The electronics then display on the display meters 50 the sum retrieved from the memory 42 of all transactions during the date span.

Upon retrieval of the historical tally sought by the user, the user is prompted in a step 402 to indicate whether the user wishes to transfer the data retrieved from the memory 42 to a personal computer by the interface 98 and the electronic card 102. If the user does not wish to transfer the data, or upon completion of the transfer at the step 102, the user is returned to the step 394 to determine whether the user wishes to continue to obtain historical information tallied by the valet 20.

If at the step 394 the user does not select a tally for the entire card at the step 396, the user proceeds to a step 404 in which the user is prompted to select a speed node 58 for which the card will retrieve a tally. The user selects a speed node 58 in the step 408 by conventional means, such as pressing the speed node in conjunction with the button for obtaining a tally, or using up and down arrows and an enter key to select the speed node 58 from the display 50. Once the speed node is selected at the step 408, the user is prompted to input a date span at a step 410 using the data entry means 68. Once the date span is entered the electronics are instructed to retrieve the tally of all transactions conducted for the selected speed node 58 between the dates specified in the date span 410. The data is entered into memory in the transaction execution mode and the data input modes, which are more particularly described below, The data retrieved from the memory 42 is then displayed in a step 413 on the speed node display means 60. The user is then prompted in a step 414 to select whether the user wishes to transfer the data to the personal computer via the interface 98 and the electronic card 102. If the user does not wish to transfer the data, or if the data transfer is completed, the user is then prompted in a step 418 to indicate whether an additional speed node 58 is to be selected.

If the user wishes to select the additional speed node 58, then the user enters or selects an additional speed node at the step 408. If the user does riot wish to proceed with an additional speed node 58, then the user is returned to the step 370 to determine whether the user wishes to continue in the data retrieval operational mode. If the user does not wish to continue in a data retrieval mode, then the user is returned to a step 210 on the flow chart 204 of FIG. 9.

Referring again to FIG. 9, the user at the step 210 is prompted to determine whether the user wishes to execute a transaction. If the user wishes to execute a transaction, then the user is transferred to a step 244 on a flow chart 243 reflecting a transaction execution mode. The flow chart 243 is connected to the flow chart 204 by off-page connector B. In the transaction execution mode, the valet 20 assists the user in keeping track of historical spending in various predetermined categories, each of which is assigned a speed node 58. The transaction execution mode also permits the user to reduce the balance assigned to the speed node, permitting a dynamic budgeting process for each category of spending.

In the transaction execution mode, the user is prompted at the step 244 to determine whether the user wishes to execute a transaction. If the user wishes to execute a transaction then, the user selects the transaction execution mode at a step 248. The selection may be accomplished by a variety of means, such as a button dedicated to selecting the mode, a display window in which the user selects the, mode through use of up and down arrows, or the like. On indicating the execution of at transaction, the user is then prompted to identify a speed node 58 at a step 250. Next, the electronics are instructed to read the balance of the card, using the balance reader 40, and to store the balance in a location in memory. Next, the electronics are instructed to retrieve from the memory 42 the balance assigned in the memory 42 to the speed node 58 in a step 254. Next, the user executes the transaction in a step 258 using conventional means for executing a smart card transaction. When the card is returned to the valet 20, the electronics of the card are prompted in a step 260 to retrieve a new balance of the card 260 using the balance reader 40 and to store the new balance in memory. Next, the electronics subtract the new balance of the card from the old balance of the card in a step 262 and store the difference, equal to the amount of the transaction, in memory. Next, the user is instructed in a step 263 to identify the speed node 58 to which the transaction should be assigned. Selection of the speed node 58 may be accomplished by conventional data entry means, such as by pressing the appropriate speed node 58 button. Next, in a step 263, the valet 20 retrieves from the memory 42 the balance of the speed node 58, and in a step 264 subtracts the difference between the new balance of the card and the old balance of the card from the balance of the speed node 58 that was identified in the step 263. Next, the card adds the difference between the new balance of the card and the old balance of the card to the historical tally for the speed node 268 in the memory 42. Next, in a step 269, the electronics add the difference between the new balance and the old balance to the historical tally for all transactions for the card as stored in the memory 42. Next in a step 270 the valet 20 displays the tally for the new speed node in the speed node display means 60. Next in a step 272, the valet 20 displays the new balance for the speed node 58 in the speed node display means 60. Alternatively, the valet 20 may proceed immediately to a step 244 to determine whether the user wishes to continue in the transaction execution mode, with or without displaying the new tally or new balance of the speed node 58.

Figure 12:
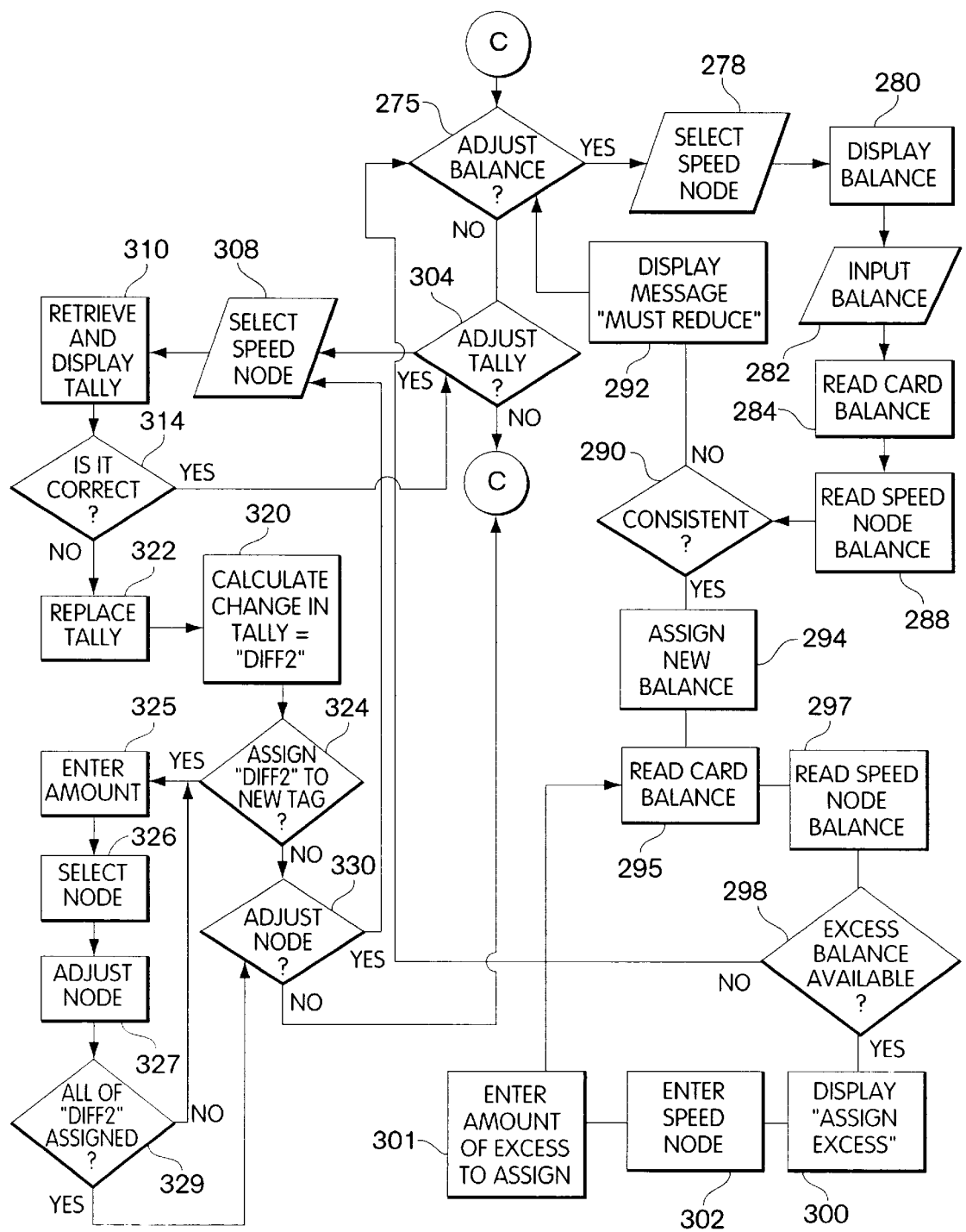
FIG. 12 is a flow chart of the steps of the data input operational mode of the present invention.

If the user wishes to continue in the transaction execution mode, then the user proceeds again to the step 248. If the user does not wish to continue in that mode, then the user is returned to the step 212 of the flow chart 204 of FIG. 12.

If the user does not wish to operate in the data retrieval operational mode, or the transaction execution operational mode, the user is prompted to operate in the data input operational mode, which commences at a step 212. One form of data input is achieved by the balance reader 40, through which the electronics of the card can determine at any time the outstanding balance of the card. The data input mode is reflected on a flow chart 271 that is connected to the flow chart 204 by an off page connector designated by the letter "C." In the data input mode the user is first prompted at a step 273 to indicate whether user wishes to adjust the balance of a speed node 58. Although the following steps reflect the situation where balances have been previously assigned to a speed node, the same steps would be used to enter initial balances on a card where no previous balances exist; thus, the user can use the balance adjustment mode to assign balances to the various speed node categories, creating a "budget" for the smart card. Through the steps described below, the user may also reassign balances from one speed node to another speed node, subject to consistency with the total balance of the card.

If the user wishes to adjust the balance, the user is instructed to select a balance input mode within the data input mode. The operational mode may be selected by any conventional data input means, such as pressing a series of buttons in a coded sequence and in coded durations, or through displays associated with arrow keys and enter keys. In an embodiment of the invention, selection of a speed node 58 is accomplished in step 278 by pressing the speed node tab 64 associated with the speed node 58 which the user wishes to adjust. Next the electronics of the valet 20 retrieve from the memory 42 the balance associated with the identified speed node 58 and display that balance in the speed node display means 60. Next in a step 282 the user is prompted to input a correct balance using the calculator 74. The numerical value of the input is assigned a temporary location in the memory 42. Next, in a step 284, the electronics determine whether the new balance assigned to the speed node is consistent with the total balances of all speed nodes and the total balance of the card. To accomplish this step, the valet 20 calculates the sum of all speed nodes balances 58 from the memory 42 and, in a step 282, determines whether the total of the speed node balances, assuming that the temporary value stored for the selected speed node 58 is substituted for the balance for that speed node previously identified in the memory 42, exceeds the total balance of the card as determined by the balance reader 40 in a step 290. If the balance does exceed the balance for the card at the step 290, then the user is instructed by the display 50 in a step 292 that the user must reduce the balance to be assigned to the speed node, and the user is returned to the step 278 to select the speed node to be adjusted. If the total balances for all speed nodes, assuming entry of the new balance for the selected speed node, do not exceed the card balance at the step 290, then the card is instructed to assign the new balance selected by the user to the speed node 58 that was selected in the step 294. Next, in a step 298, the card determines whether there is a difference between the total balance of the card and the total balances of the speed nodes 58. If there is an excess balance for the card, then the user is prompted to identify a speed node 58 to which the excess balance will be applied in a step 300. Next, in a step 301 the user is prompted to input the amount of the excess balance to be assigned to the new speed node 58. The user is then returned to the step 288 in which the total balances of the card, assuming that the amount input by the calculator replaces the current amount for the speed node 58 in memory, exceeds the card balance. These steps are repeated until the total balances for all speed nodes equals the card balance, at which time the user is returned to the step 273 to determine whether further adjustments to the balances of the speed nodes are desired.

If the user does not wish to adjust the balance of a speed node 58, then the user proceeds to a step 304 in which the user indicates whether the user wishes to adjust the historical tally for a speed node. The user wishes to adjust the tally, then the user is prompted to identify the speed node 58 in a step 308. Upon identification of the speed node 58 in the step 308, the electronics retrieve the historical tally for that speed node 58 from memory in a step 310. In a step 312, the valet 20 then displays the historical tally for the speed node 58 in the speed node display means 60. In a step 314 the user is prompted to determine whether the tally is correct. If the user determines that the tally is correct, the user is returned to the step 304 to determine whether further adjustments to other speed nodes are required. If the speed node :58 is determined at the step 314 to be incorrect, then the user is prompted to input the correct tally using the calculator 74 at a step 318. The electronics are instructed to calculate the difference between the amount entered at the step 318 and the historical tally assigned to the speed node identified in memory 42. The user is then requested to assign to a new speed node at a step 322 the difference determined at the step 320. The user selects the is different speed node to which the difference is to be assigned a step 324 and in a step 325 the electronics of the valet 20 replace the value for the speed node in the memory 42 to reflect the reassignment of the amount from the first speed node that was selected 58. The user may refuse at the step 322 to assign the new tally to a speed node. If the user selects not to assign the new speed node, or upon completion of the adjustment of the speed nodes, user is prompted to determine whether user wishes to adjust the tally for another speed node in a step 330. If the user does not wish to adjust the tally, then the user is returned to the flow chart 204 and operation of the valet 20 is complete.

Figure 11:
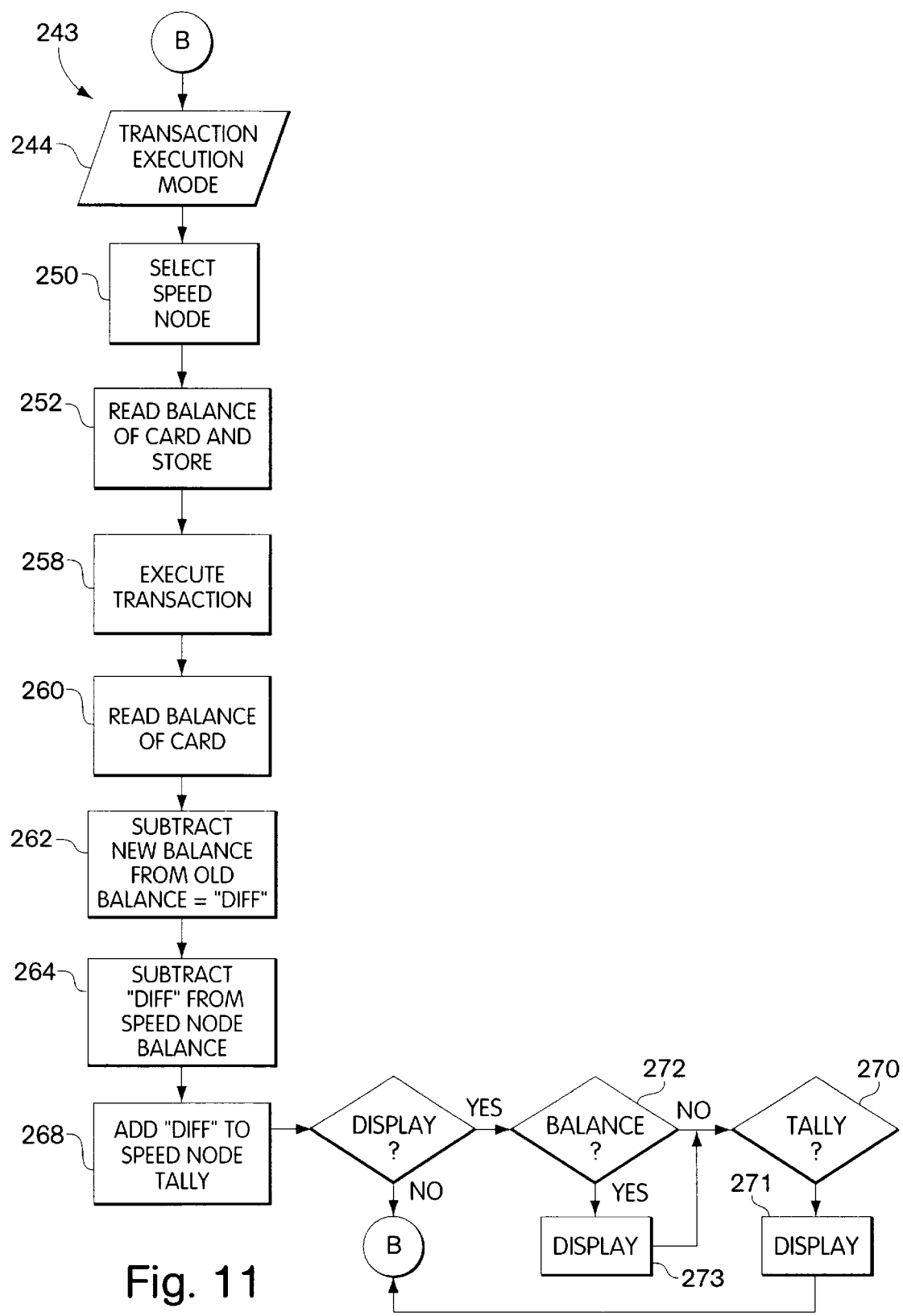
FIG. 11 is a flow chart of the transaction execution mode of the present invention.

Although steps for data retrieval, transaction execution, and data input are disclosed in the flow charts of FIGS. 9, 10 and 11, variations of those steps are within the scope of the invention and would be recognized by one of ordinary skill in the art. In particular, other steps, and different ordering of the steps, could be readily used to achieve a smart card valet that reads the balance of a smart card, tallies transactions for given dates and predetermined categories of purchase, permits assignment of balances to predetermined budget categories, and permits transfer of data to a personal computer.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A valet for a electronic card, comprising:

a container for receiving and securing the electronic card;

memory for storing data;

a balance reader, for reading data stored in the electronic card, wherein the balance reader comprises memory for storing data, data transfer means, for transferring data from the electronic card to the memory, data retrieval means, for retrieving data from the memory, and a first display, for displaying the balance of the electronic card;

a processor, for manipulating the information in memory, wherein the processor comprises an application specific integrated circuit;

a second display, for displaying data output by the processor; and speed nodes, capable of identification, classification and tallying of individually-specified purchase types, wherein the activation of a speed node prior to a transaction identifies the transaction as associated with a particular classification and causes the amount and classification of the transaction to be stored in memory.

2. The valet of claim 1, further comprising:

means for storing other cards.

3. The valet of claim 1, further comprising:

speed node identifiers disposed proximal to the speed nodes.

4. The valet of claim 1, further comprising:

a keyboard for entering data into the memory.

5. The valet of claim 1, further comprising:

means for securing a calculator to the valet.

6. The valet of claim 5, further comprising:

a calculator secured to the valet.

7. The valet of claim 1, further comprising:

slots, for receiving receipts, wherein the slots are of varied sizes.

8. The valet of claim 1, further comprising:

means for receiving a calendar.

9. The valet of claim 1, further comprising:

means for recording a transaction record.

10. The valet of claim 1 further comprising a notebook.

11. The valet of claim 1, where in the speed nodes are used to tally owner-specified cost items.

12. The valet of claim 1, further comprising:

a folding container.

13. The valet of claim 1, further comprising:

a microchip responsive to a personal identification number Providing user privacy.

14. The valet of claim 1, further comprising:

means for attachment onto a filofax.

15. The valet of claim 1, further comprising:

means for attachment onto a briefcase.

16. The valet of claim 1, further comprising:

means for interface to a computer.

17. The valet of claim 1, further comprising:

a connection for transferring data from the electronic card valet to the computer, wherein the connection comprises an electronic transfer card.

18. A valet for a electronic card, comprising:

a balance reader, for reading data stored in the electronic card;

memory;

a display for displaying data; and a plurality of speed nodes for identifying, tracking and tallying financial transactions.

19. The valet of claim 18, further comprising:

speed node identifiers disposed proximal to the speed nodes.

20. The valet of claim 18, further comprising:

data entry means, for manipulating data in memory.

21. The valet of claim 18, wherein the speed nodes are used to tally owner-specified cost items.

22. The valet of claim 18, further comprising:

a microchip responsive to a personal identification number for providing user privacy.

23. The valet of claim 18, further comprising:

an interface for transferring data from the electronic card valet to the computer.

24. A method for tracking transactions made by a electronic card, comprising:

providing a container for a electronic card;

providing a balance reader, for reading data stored in the electronic card;

providing memory for storing data;

providing a display for displaying data output by the balance reader; and providing speed nodes, capable of identification, classification and tallying of individually-specified purchase types, wherein the activation of a speed node prior to a transaction identifies the transaction as associated with a particular classification and causes the amount and classification of the transaction to be stored in the balance reader.

25. The method of claim 24, further comprising:

providing means for storing other cards.

26. The method of claim 24, further comprising:

providing data entry means, for manipulating data in the memory.

27. The method of claim 24, wherein the speed nodes are used to tally owner-specified cost items.

28. The method of claim 24, further comprising:

providing user privacy by employing a microchip responsive to a personal identification number.

29. The method of claim 24, further comprising:

providing an interface between the electronic card valet and a computer.

30. A electronic card valet, comprising a plurality of speed nodes, each speed node associated with a budget and a total for a category of transaction, each speed node capable of tracking the budget and the total upon a transaction of the electronic card in the category.

* * * * *